United States Patent
Ando

(10) Patent No.: US 9,877,377 B2
(45) Date of Patent: Jan. 23, 2018

(54) LIGHTING CONTROL DEVICE GENERATING POWER FROM MECHANICAL ENERGY AND LIGHTING DEVICE

(71) Applicant: PANASONIC INTELLECTUAL PROPERTY MANAGEMENT CO., LTD., Osaka (JP)

(72) Inventor: Tamotsu Ando, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/423,373

(22) Filed: Feb. 2, 2017

(65) Prior Publication Data

US 2017/0231067 A1  Aug. 10, 2017

(30) Foreign Application Priority Data

Feb. 5, 2016  (JP) .................................. 2016-021348

(51) Int. Cl.
  *H05B 37/02*  (2006.01)
  *H05B 33/08*  (2006.01)
  (Continued)

(52) U.S. Cl.
  CPC ............ *H05B 37/0272* (2013.01); *F21S 8/04* (2013.01); *F21V 3/02* (2013.01); *G08C 17/02* (2013.01);
  (Continued)

(58) Field of Classification Search
  CPC ... H05B 37/0272; H05B 33/0845; F21S 8/04; F21V 3/02; G08C 17/02
  (Continued)

(56) References Cited

U.S. PATENT DOCUMENTS 6,538,568 B2 * 3/2003 Conley .................. G08B 7/062
                                                                    315/86
9,506,724 B1 * 11/2016 Hazelton ................... F41G 3/08
(Continued)

FOREIGN PATENT DOCUMENTS

JP    2011-216314 A    10/2011
JP    2013-062770 A     4/2013
(Continued)

*Primary Examiner* — Dylan White
(74) *Attorney, Agent, or Firm* — McDermont Will & Emery LLP

(57) ABSTRACT

A lighting control device having a first wireless communicator that wirelessly communicates with a lamp; first memory that stores identification information identifying the lighting control device; a first controller that transmits a control command for controlling the lamp to the lamp via the first wireless communicator; an operator interface suspended under its own weight; and a power generator that is connected to the operator interface, generates power from mechanical energy produced by the operator interface being moved in a predetermined direction, and supplies the power to the first controller, the first memory, and the first wireless communicator. Further, when the operator interface is moved and the first controller receives the power, the first controller reads the identification information from the first memory, transmits the identification information and the control command to the lamp via the first wireless communicator, so as to control the lamp.

12 Claims, 12 Drawing Sheets

(51) Int. Cl.
    *F21S 8/04* (2006.01)
    *F21V 3/02* (2006.01)
    *G08C 17/02* (2006.01)
    *F21Y 115/10* (2016.01)
    *H04L 12/28* (2006.01)

(52) U.S. Cl.
    CPC ..... *H04L 12/2816* (2013.01); *H05B 33/0845* (2013.01); *F21Y 2115/10* (2016.08); *H04L 2012/2841* (2013.01)

(58) Field of Classification Search
    USPC .......................................................... 315/307
    See application file for complete search history.

(56) References Cited

U.S. PATENT DOCUMENTS

| | | | |
|---|---|---|---|
| 9,713,234 B2 * | 7/2017 | Gotoh | H05B 37/0272 |
| 2013/0135333 A1 * | 5/2013 | Chen | H05B 33/0863 345/589 |

FOREIGN PATENT DOCUMENTS

| | | |
|---|---|---|
| JP | 2013-115039 A | 6/2013 |
| JP | 2015-115930 A | 6/2015 |
| JP | 2015-179562 A | 10/2015 |

* cited by examiner

LIGHTING CONTROL DEVICE GENERATING POWER FROM MECHANICAL ENERGY AND LIGHTING DEVICE

CROSS REFERENCE TO RELATED APPLICATION

This application claims the benefit of priority of Japanese Patent Application Number 2016-021348 filed on Feb. 5, 2016, the entire content of which is hereby incorporated by reference.

BACKGROUND

1. Technical Field

The present disclosure relates to a lighting control device for controlling a lamp, and a lighting device including the lighting control device.

2. Description of the Related Art

Lighting control devices which are capable of wirelessly controlling a lamp have been proposed and received attention in recent years.

Known examples of such a lighting control device include tablets and mobile phones. For example, Japanese Unexamined Patent Application Publication No. 2013-115039 discloses a technique of adjusting a lighting state of a lamp by operating a tablet in accordance with an operation method displayed on the tablet display.

SUMMARY

With the technique disclosed in Japanese Unexamined Patent Application Publication No. 2013-115039, since it is possible to adjust the lighting state of the lamp utilizing the wireless communication capability of the tablet, the lighting state of the lamp can be adjusted without having to go near the lamp or a switch fixed to the wall.

However, for example, when returning home late at night, having to launch the user interface screen on the tablet in the dark and further having to interact with the user interface screen to turn on the lamp is bothersome to the user, who is in a hurry to turn on the lights. In this situation, this technique is not user friendly.

In light of this, the present disclosure provides a lighting control device and lighting device with which a lighting state of the lamp can be changed with a simple operation.

According to one aspect of the present disclosure, a lighting control device includes: a first wireless communicator that wirelessly communicates with a lamp; first memory that stores identification information identifying the lighting control device; a first controller that transmits a control command for controlling the lamp to the lamp via the first wireless communicator; an operator interface suspended under weight of the operator interface; and a power generator that is connected to the operator interface, generates power from mechanical energy produced by the operator interface being moved in a predetermined direction, and supplies the power to the first controller, the first memory, and the first wireless communicator. When the operator interface is moved and the first controller receives the power, the first controller reads the identification information from the first memory, transmits the identification information and the control command to the lamp via the first wireless communicator, and controls the lamp.

Moreover, according to one aspect of the present disclosure, a lighting device includes a lamp and a lighting control device. The lamp includes: a light source; a second wireless communicator that wirelessly communicates with the first wireless communicator in the lighting control device; second memory that stores identification information identifying the lighting control device; and a second controller that compares identification information identifying the lighting control device and received by the second wireless communicator against the identification information stored in the second memory, and when the identification information matches, controls operation of the light source in accordance with a control command for controlling the lamp received by the second wireless communicator.

Accordingly, it is possible to change a lighting state of the lamp with a simple operation.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

Figure 1:
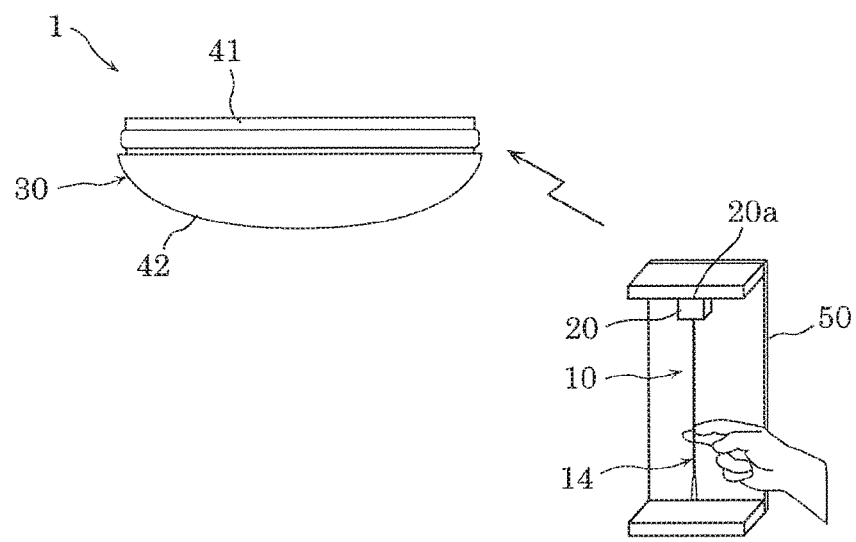
FIG. 1 illustrates the lighting control device and the lamp included in the lighting device according to Embodiment 1.

The following describes embodiments with reference to the drawings. Note that the embodiments described below each show a specific example of the present disclosure. The numerical values, shapes, materials, elements, the arrangement and connection of the elements, etc., indicated in the following embodiments are mere examples, and therefore do not intend to limit the inventive concept. Therefore, among the elements in the following embodiments, those not recited in any of the independent claims defining the most generic part of the inventive concept are described as optional elements.

Note that the drawings are schematic diagrams and are not necessarily precise illustrations. Moreover, in the drawings, elements having the same essential configuration share the same reference numerals, and multiple descriptions thereof are omitted or abridged.

Embodiment 1

(Outline of Lighting Device)

Figure 2:
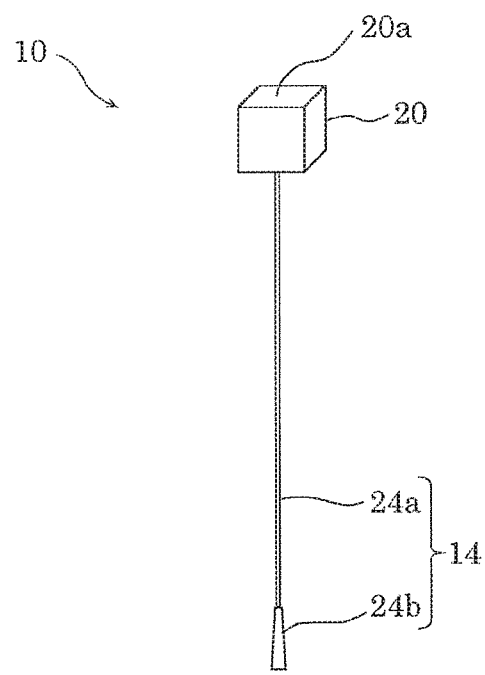
FIG. 2 is a perspective view of the lighting control device according to Embodiment 1.
Figure 3:
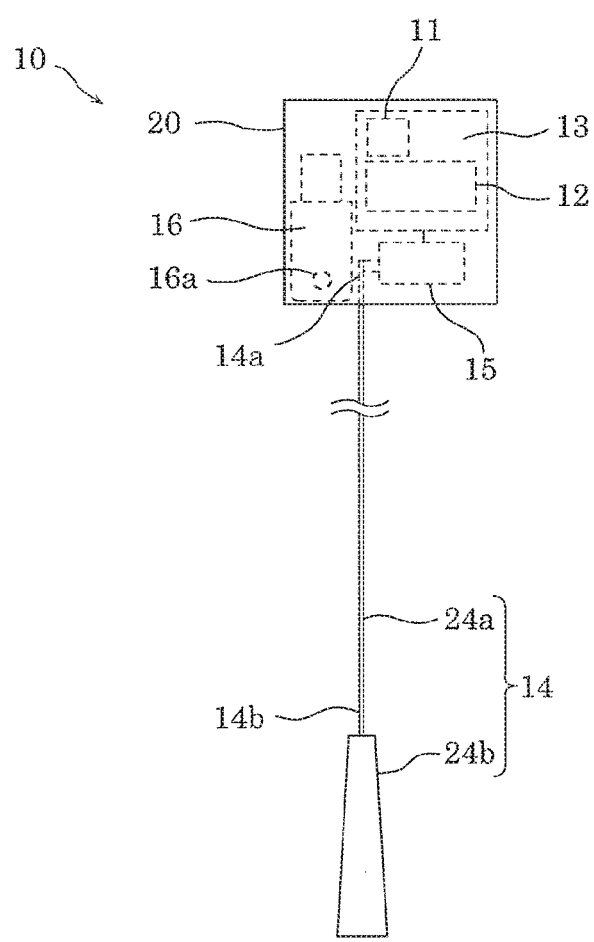
FIG. 3 is a front view of the lighting control device according to Embodiment 1.
Figure 4:
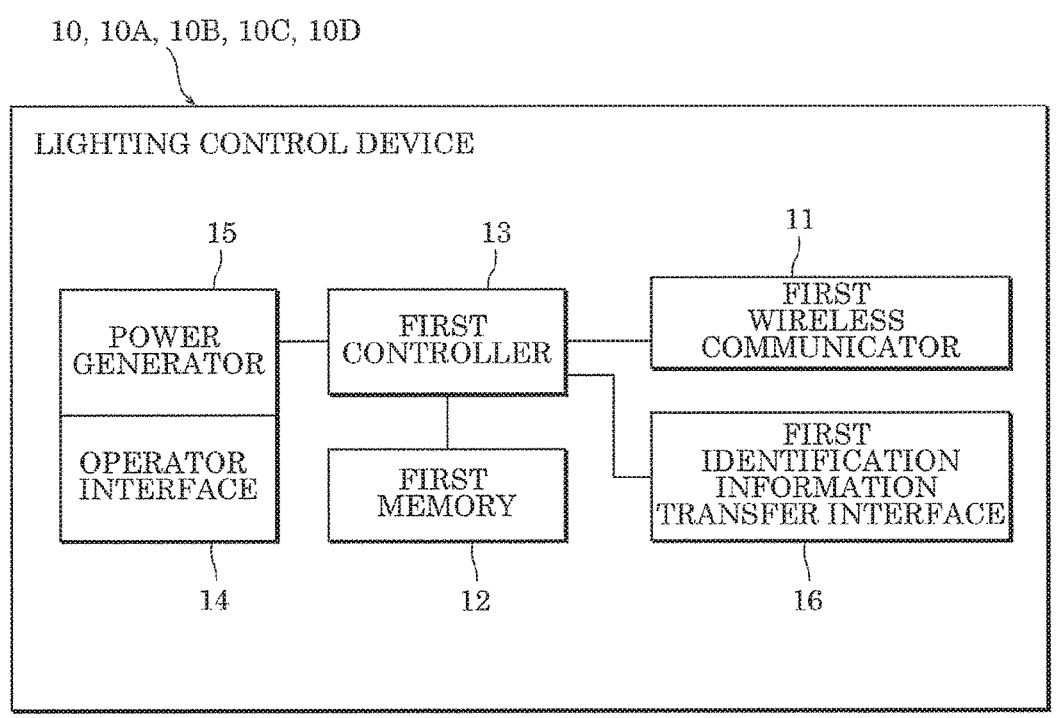
FIG. 4 is a block diagram illustrating the control layout of the lighting control device according to Embodiment 1.

FIG. 1 illustrates lighting device 1 according to Embodiment 1. FIG. 2 is a perspective view of lighting control device 10, FIG. 3 is a front view of lighting control device 10, and FIG. 4 is a block diagram illustrating the control layout of lighting control device 10.

As illustrated in FIG. 1, lighting device 1 includes lamp 30 and lighting control device 10. Lamp 30 is, for example, a ceiling light installed in a structure of a building (such as a ceiling) such as a residential building. Lighting control device 10 is a switch that, for example, turns on, dims, and turns off lamp 30 via wireless communication. In FIG. 1, lighting control device 10 and support 50 are located spaced away from lamp 30. Support 50 is a self-standing box-like object including a bottom plate, a post, and a top plate. Lighting control device 10 is attached to the top plate of support 50.

Next, the structures of lighting control device 10 and lamp 30 will be described.

(Lighting Control Device Structure)

As illustrated in FIG. 3 and FIG. 4, lighting control device 10 includes first wireless communicator 11, first memory 12, first controller 13, first identification information transfer interface 16, power generator 15, and operator interface 14.

Among the components of lighting control device 10, first wireless communicator 11, first memory 12, first controller 13, first identification information transfer interface 16, and power generator 15 are housed inside cuboid case (housing) 20. Case 20 is made of a material through which radio waves can pass (for example, resin). Operator interface 14 is mainly located outside of case 20 and protrudes vertically downward.

As illustrated in FIG. 2 and FIG. 1, case 20 includes, on the top outer surface thereof, mount 20a for attaching case 20 to support 50. In this embodiment, case 20 is directly fixed to support 50. Note that case 20 is not limited to being directly fixed to support 50; case 20 may be fixed to support 50 using a screw or a string. When a screw or string is used, case 20 is attachable to and removable from support 50, making lighting control device 10 easily portable.

Operator interface 14 is suspended vertically under its own weight. Operator interface 14 is a switch component that the operator of lighting control device 10 directly interacts with by contact, and for example, has a structure that can be held by the operator and is easy for the operator to operate.

More specifically, operator interface 14 includes a straight string 24a and a protruding grip 24b located at the bottom of string 24a. String 24a is, for example, a pliable string or flexible wire. Top part 14a of operator interface 14 is connected to power generator 15 in case 20. Operator interface 14 extends vertically due to grip 24b which functions as a plumb bob, and bottom part 14b of operator interface 14 is drawn from case 20. With this configuration, the operator of lighting control device 10 can easily operate lighting control device 10 while holding operator interface 14. In this embodiment, operator interface 14 protrudes no less than 100 mm and no more than 500 mm from case 20.

Note that the string or wire of operator interface 14 may be formed or bent into a U-shape or ring shape. In other words, operator interface 14 may suspended under its own weight and may have a shape that is easy for the operator of operator interface 14 to hold or pinch.

Next, first wireless communicator 11, first memory 12, first controller 13, first identification information transfer interface 16, and power generator 15 housed in case 20 will be described in the written order.

First wireless communicator 11 includes an antenna and wireless module. When the operator operates operator interface 14, a radio wave signal is output from first wireless communicator 11 and transmits through case 20. Lighting control device 10 is capable of communicating with lamp 30 located within a predetermined distance via first wireless communicator 11. Examples of the communication system used between lighting control device 10 and lamp 30 include specified low power radio that uses a frequency in the 920 MHz or 2.4 GHz band, Zigbee®, Bluetooth®, and WiFi®.

First memory 12 includes RAM capable of writing and storing data, and ROM capable of storing a program. Identification information (ID information) identifying lighting control device 10 is stored in first memory 12.

First controller 13 includes a control circuit including a CPU. First controller 13 transmits identification information and a control command to lamp 30 via first wireless communicator 11. When the transmitted identification information is registered in lamp 30 in advance, first controller 13 can control the lighting state of lamp 30.

The control command is, more specifically, a command for turning on, dimming, or turning off lamp 30. However, in this embodiment, the control command is one type of command that is generated by operator interface 14 being pulled and moved. Therefore, as will be described later, the turning on, dimming, or turning off of lamp 30 is determined and performed by lamp 30, in accordance with the accumulated number of times control command has been received by lamp 30.

Figure 12:
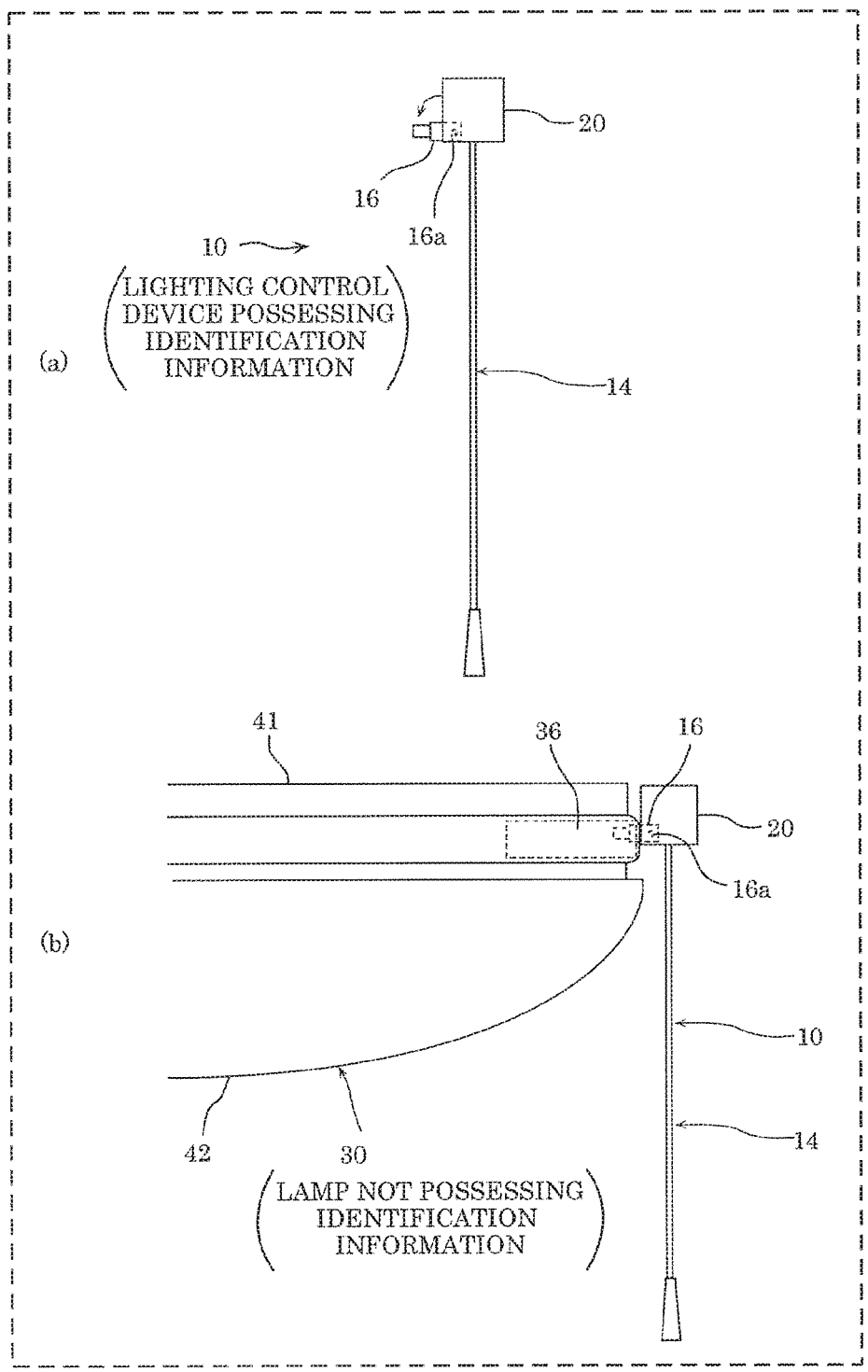
FIG. 12 illustrates a situation in which pairing is performed with a lamp that does not possess identification information in the lighting device according to Embodiment 2.

First identification information transfer interface 16 is, for example, a USB plug which rotates about axis of rotation 16a attached to case (housing) 2 and has a connection terminal that protrudes from case 20 (see (a) in FIG. 12).

First identification information transfer interface 16 is a communication interface for transferring the identification information to an external device, and is located on a different route than first wireless communicator 11. For example, when lighting control device 10 and lamp 30 are paired ("pairing" meaning establishing a connection between two devices such that they can transmit and receive signals to and from one another), the identification information is transferred via first identification information transfer interface 16. When pairing is used, it is preferable that power be supplied to lighting control device 10 via first identification information transfer interface 16 from an external device.

Power generator 15 is a power generation device that generates power for running lighting control device 10. Power generator 15 generates power by converting mechanical energy imparted by operator interface 14 being moved in a predetermined direction (vertical direction in this embodiment) into electric energy.

A piezoelectric device, which utilizes the piezoelectric effect of converting mechanical stress into voltage, is used as power generator 15. Power generator 15 includes the piezoelectric device, a trigger connected to operator interface 14, and a hammer that strikes the piezoelectric device in conjunction with operation of the trigger. With this configuration, power is generated as a result of the trigger being pulled using operator interface 14 and the hammer striking and deforming the piezoelectric device.

Moreover, in place of a piezoelectric device, a power generator that utilizes electromagnetic induction may be used as power generator 15. In this case, power generator 15 includes, for example, a pair of coils, a pair of yokes serving as the coil magnetic core that protrude in the direction in which a coil shaft extends, and a magnet connected to operator interface 14 and rotatably disposed between the two protruding yokes. With this, power can be generated by rotating the magnet using operator interface 14 and altering the angle of the magnet relative to the yoke.

In this way, power generator 15 runs lighting control device 10 by supplying generated power to first controller 13, first memory 12, and first wireless communicator 11.

With lighting control device 10 according to this embodiment having the configuration described above, power is generated in power generator 15 by operator interface 14 being moved vertically, and the generated power is supplied to first controller 13, first memory 12, and first wireless communicator 11. First controller 13, which receives the generated power, reads the identification information from first memory 12 and transmits the control command and the read identification information for lamp 30 to lamp 30 via first wireless communicator 11. With this, lighting control device 10 can control lamp 30 since the identification information is registered in lamp 30 in advance.

Note that when the lighting state of lamp 30 is to be controlled, lighting control device 10 runs off power supplied from power generator 15 and when lighting control device 10 is paired with an external device (such as lamp 30), lighting control device 10 runs off power supplied from an external device. First controller 13 can detect whether power is being supplied from power generator 15 or an external device, and can determine whether to transmit the identification information using first wireless communicator 11 or transfer the identification information using first identification information transfer interface 16.

(Lamp Structure)

As previously described, lamp 30 is a ceiling light installed in, for example, the ceiling, and includes main body 41 and globe 42 that covers main body 41. Globe 42 is made of a resin material having light transmitting properties.

Figure 5:
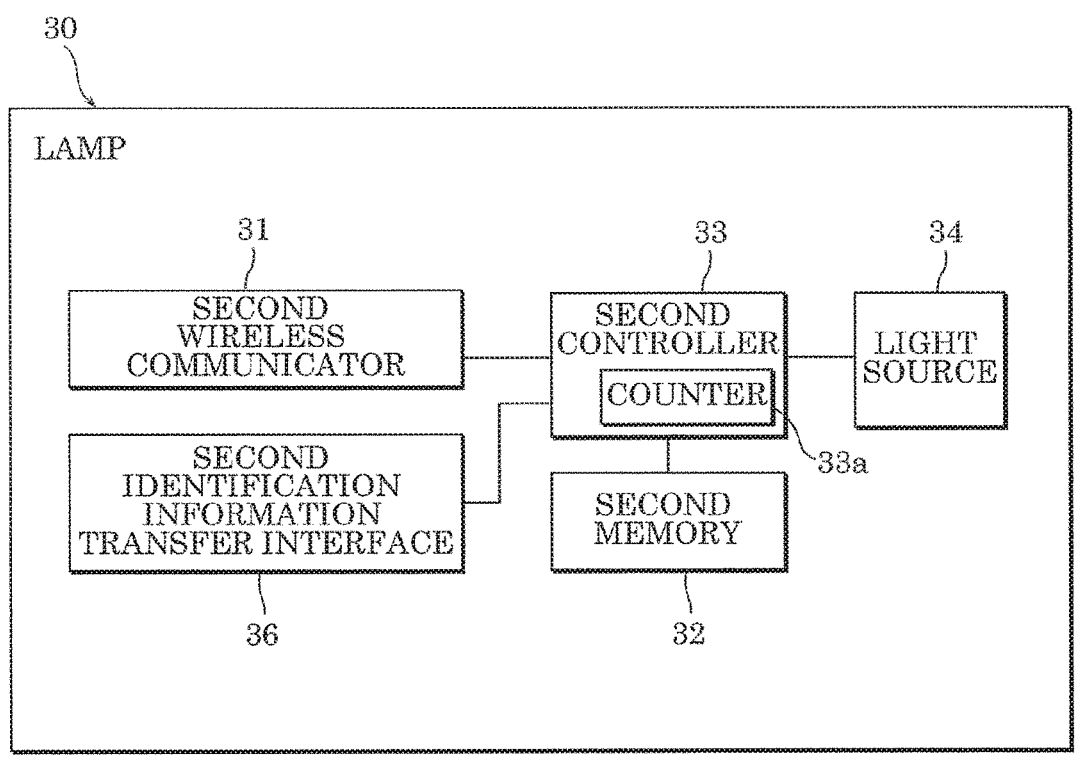
FIG. 5 is a block diagram illustrating the control layout of the lamp device according to Embodiment 1.

As illustrated in FIG. 5, main body 41 includes light source 34, second wireless communicator 31, second memory 32, second controller 33, and second identification information transfer interface 36.

Light source 34 includes a plurality of light emitting diodes that respectively emit, for example, white light, red light, green light, or blue light. Light source 34 is turned on, dimmed, and turned off by second controller 33.

Second wireless communicator 31 includes an antenna and wireless module. Second wireless communicator 31 is capable of communicating with lighting control device 10 located within a predetermined distance, and receives the previously described identification information and control command from lighting control device 10.

Second memory 32 includes RAM capable of writing and storing data, and ROM capable of storing a program. Identification information identifying lighting control device 10, which has been verified in advance as a device for operating lamp 30, is stored in second memory 32. When the transmitted identification information matches identification information registered in second memory 32, lighting control device 10 can control lamp 30.

Second controller 33 includes a control circuit including a CPU. Second controller 33 includes a lighting circuit for turning on light source 34. Second controller 33 receives the previously described identification information and control command from lighting control device 10 via second wireless communicator 31. The control command is, more specifically, a command for turning on, dimming, or turning off lamp 30.

However, since the control command transmitted from lighting control device 10 is one type of command generated by pulling and moving operator interface 14, the turning on, dimming, and turning off of lamp 30 is performed by lamp 30. Therefore, second controller 33 includes counter 33a for counting the number of times second controller 33 receives the control command from lighting control device 10. For example, each time second controller 33 receives the control command from lighting control device 10, counter 33a is counted up, and in accordance with the counting up of counter 33a, second controller 33 switches between turning on, dimming, and turning off light source 34 in order.

Second identification information transfer interface 36 is, for example, a USB receptacle, and has an exposed connection terminal. Second identification information transfer interface 36 is a separate communication interface from second wireless communicator 31, and transfers identification information between an external device. For example, when pairing with lighting control device 10, power is supplied to lighting control device 10 and the identification information is transferred via first identification information transfer interface 16.

(Operations Performed by Lighting Control Device and Lamp)

Figure 6:
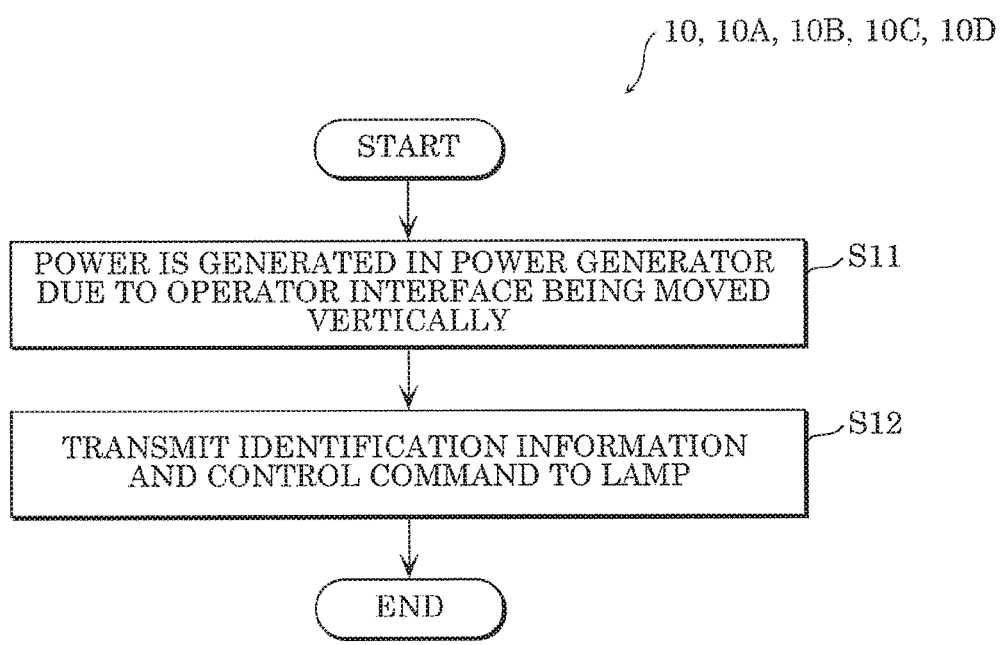
FIG. 6 is a flowchart of operations performed by the lighting control device according to Embodiment 1.
Figure 7:
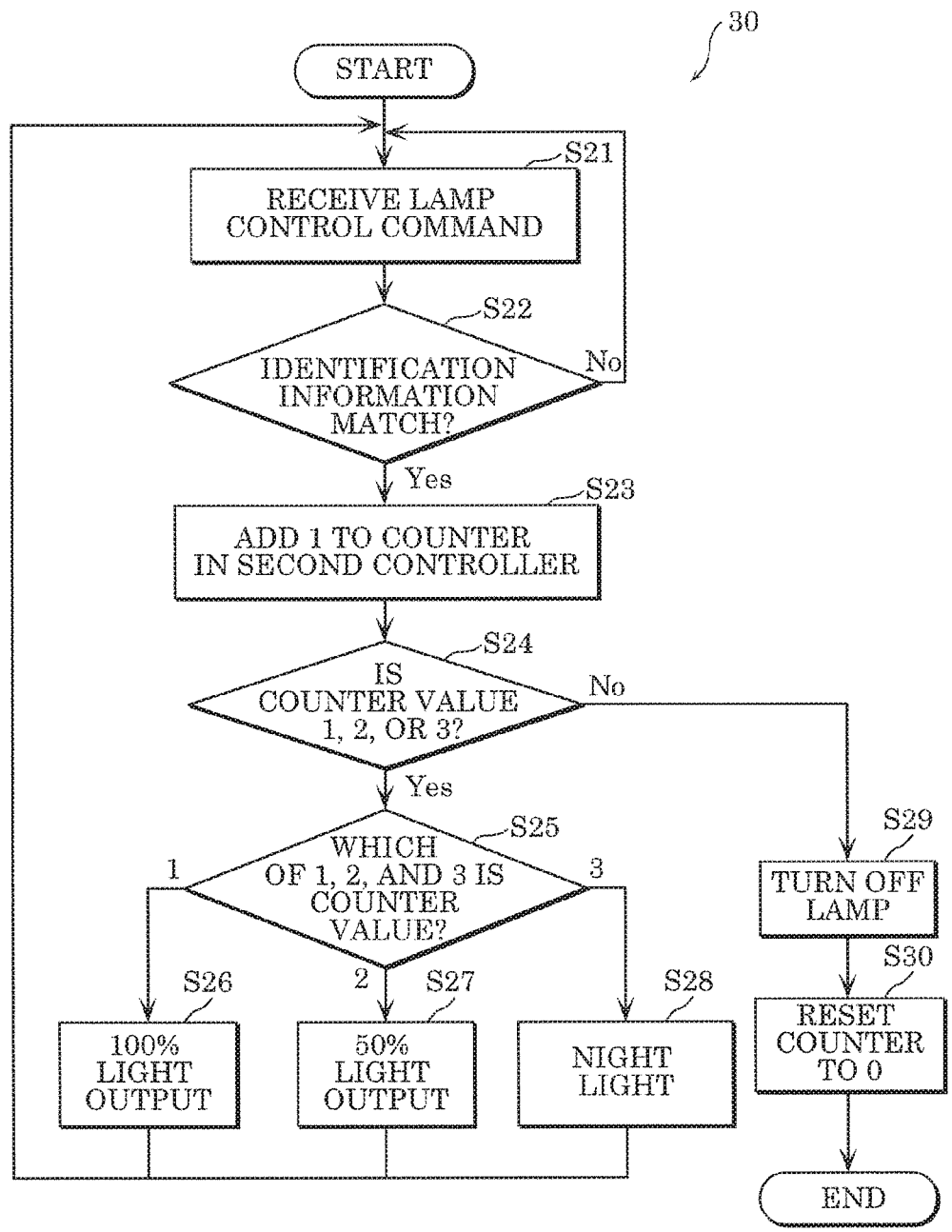
FIG. 7 is a flowchart of operations performed by the lamp according to Embodiment 1.

Next, operations performed by lighting control device 10 and lamp 30 will be described. FIG. 6 is a flowchart of operations performed by lighting control device 10, and FIG. 7 is a flowchart of operations performed by lamp 30.

First, in lighting control device 10, operator interface 14 is moved vertically (pulled downward) whereby mechanical energy is imparted to power generator 15. Then in power generator 15, the mechanical energy is converted into electric energy and power is generated (S11). The generated power is supplied to first controller 13, first wireless communicator 11, and first memory 12.

First controller 13, which receives the generated power, reads the identification information from first memory 12 and transmits the control command and the read identification information to lamp 30 via first wireless communicator 11 (S12).

Note that a predetermined command in which the identification information and the control command are combined may be predefined by a protocol between lighting control device 10 and lamp 30, and, essentially, transmission of the identification information and control command can be performed by transmitting the predetermined command.

In this way, lighting control device 10 can transmit the identification information and the control command to lamp 30 in response to a simple operation of moving operator interface 14 vertically.

Lamp 30 receives the identification information and the control command transmitted by lighting control device 10 (S21).

Second controller 33 determines whether the identification information transmitted from lighting control device 10 and the identification information saved in second memory 32 match (S22). When second controller 33 determines that the identification information does not match (no in S22), second controller 33 does not execute the control command transmitted from lighting control device 10 and maintains the current lighting state of lamp 30. When second controller 33 determines that the identification information matches (yes in S22), second controller 33 begins preparation for changing the lighting state of lamp 30. More specifically, second controller 33 adds 1 to the counter value of counter 33a, which governs the lighting state of lamp 30 (S23).

Next, second controller 33 determines whether the counter value of counter 33a is either one of 1, 2, or 3, or some other value (S24).

When the counter value is neither 1, nor 2, nor 3 (no in S24), second controller 33 turns off light source 34 (S29) and resets the counter value to 0 (S30), whereby operation by lamp 30 is concluded.

When the counter value is 1, 2, or 3 (yes in S24), the process continues to the next step, and second controller 33 determines which of 1, 2, and 3 the counter value is (S25).

Second controller 33 causes light source 34 to emit light at 100% output when the counter value is 1 (S26), causes light source 34 to emit light at 50% output when the counter value is 2 (S27), and places light source 34 in a night light mode when the counter value is 3 (S28), and then concludes control of the lighting state of lamp 30. Note that when the identification information and the control command are received again from lighting control device 10, second controller 33 performs the processes laid out in the flowchart illustrated in FIG. 7.

In this way, each time lamp 30 receives a simple control command from lighting control device 10, second controller 33 switches between turning on, turning off, and dimming lamp 30 in order.

Note that in the example given in FIG. 7, using lighting control device 10, lamp 30 in a non-light-emitting state is caused to emit light at 100% output (S26), but when the non-light-emitting state is to be changed to the light-emitting state, a different switch than lighting control device 10 can be used. For example, a wall switch may be provided on the wall of a room, and lamp 30 may be caused to emit light at 100% output when the wall switch is turned ON. Then, subsequent dimming or turning off of lamp 30 may be performed using lighting control device 10.

(Advantageous Effects, Etc.)

Lighting control device 10 includes: first wireless communicator 11 that wirelessly communicates with lamp 30; first memory 12 that stores identification information identifying lighting control device 10; first controller 13 that transmits a control command for controlling lamp 30 to lamp 30 via first wireless communicator 11; operator interface 14 suspended under its own weight; and power generator 15 that is connected to operator interface 14, generates power from mechanical energy produced by operator interface 14 being moved in a predetermined direction, and supplies the power to first controller 13, first memory 12, and first wireless communicator 11. When operator interface 14 is moved and first controller 13 receives the power, first controller 13 reads the identification information from first memory 12, transmits the identification information and the control command to lamp 30 via first wireless communicator 11, and controls lamp 30.

This configuration makes it possible to control the lighting state of lamp 30 using lighting control device 10 by a simple operation of moving suspended operator interface 14 in a predetermined direction.

Moreover, operator interface 14 may include string 24a, and power generator 15 may generate the power from the mechanical energy produced by operator interface 14 being moved vertically downward while being held.

In this way, when operator interface 14 is a string, it is possible to easily operate lighting control device 10 by holding and moving operator interface 14.

Moreover, power generator 15 may generate the power from the mechanical energy by utilizing either one of a piezoelectric effect and electromagnetic induction.

This configuration makes it possible to efficiently convert mechanical energy produced in accordance with movement of operator interface 14 into electric energy, and run lighting control device 10. Moreover, it is possible to make lighting control device 10 compact since it is not necessary to install a battery in lighting control device 10.

Moreover, lighting control device 10 may further include case 20 that houses first wireless communicator 11, first memory 12, first controller 13, and power generator 15. Top part 14a of operator interface 14 is connected to power generator 15 in case 20, and bottom part 14b of operator interface 14 protrudes from case 20.

This configuration makes it easier to hold bottom part 14b of operator interface 14 protruding from case 20, making it easier to operate lighting control device 10. Moreover, since first wireless communicator 11, first memory 12, first controller 13, and power generator 15, for example, are housed in case 20, lighting control device 10 is portable and can be carried into and placed down in a bedroom, making it possible to immediately change the lighting state of lamp 30. In other words, since lighting control device 10 can be placed within arm's reach and easily operated, lighting control device 10 according to this embodiment is extremely convenient to use.

Moreover, case 20 may include, on the outer surface thereof, mount 20a for attaching case 20 to another component.

This configuration increases the operability of lighting control device 10 since it is possible to attach lighting control device 10 in a location that makes it easy for the operator to operate. For example, when lighting control device 10 is installed at the entrance of a room, it is possible to immediately change the lighting state of lamp 30 upon entering the room.

Moreover, lighting device 1 according to this embodiment includes lamp 30 and lighting control device 10. Lamp 30 includes: light source 34; second wireless communicator 31 that wirelessly communicates with first wireless communicator 11 in lighting control device 10; second memory 32 that stores identification information identifying lighting control device 10; and second controller 33 that compares identification information identifying lighting control device 10 and received by second wireless communicator 31 against the identification information stored in second memory 32, and when the identification information matches, controls operation of light source 34 in accordance with a control command for controlling lamp 30 received by second wireless communicator 31.

This configuration makes it possible to provide lighting device 1 capable of changing the light state of lamp 30 in response to a simple operation performed on lighting control device 10.

Moreover, each time second wireless communicator 31 receives the control command from lighting control device 10, second controller 33 may switch between turning on, dimming, and turning off light source 34 in a predetermined order.

This configuration makes it possible to provide lighting device 1 capable of changing between turning on, dimming, and turning off light source 34 per reception of a simple control command from lighting control device 10.

Variation 1

Figure 8:
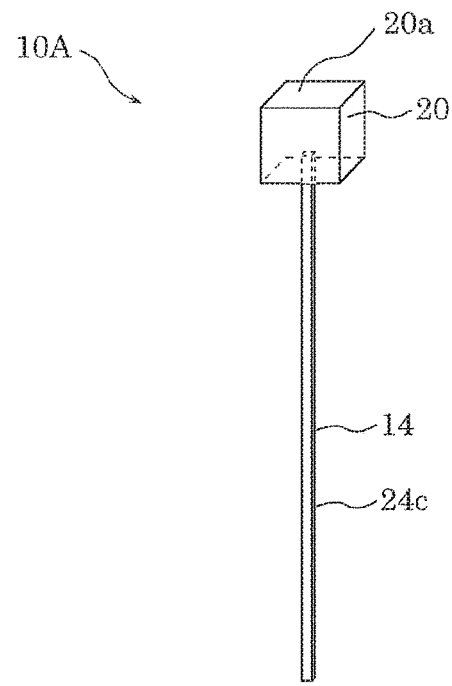
FIG. 8 is a perspective view of the lighting control device according to Variation 1 of Embodiment 1.

FIG. 8 is a perspective view of lighting control device 10A according to Variation 1 of Embodiment 1. With lighting control device 10A according to Variation 1, operator interface 14 is configured as rod 24c.

Operator interface 14 according to Variation 1 may have the shape of a polygonal or circular shaft. Operator interface 14 is made of a material that does not easily deform, for example, resin or metal. Top part 14a of operator interface 14 is connected to power generator 15 in case 20. Operator interface 14 is oriented vertically by its own weight, and bottom part 14b of operator interface 14 protrudes out of case 20. With this configuration, the operator of lighting control device 10A can easily operate lighting control device 10A by holding and pulling operator interface 14 downward or pushing operator interface 14 upward.

With lighting control device 10A according to Variation 1, mechanical energy is imparted to power generator 15 by holding and moving operator interface 14 in a vertical direction (upward or downward). Then in power generator 15, the mechanical energy is converted into electric energy and power is generated. The generated power is supplied to first controller 13, first wireless communicator 11, and first memory 12, and lighting control device 10A runs. Similar to lighting control device 10, with lighting control device 10A as well, it is possible to control the lighting state of lamp 30 by a simple operation of moving suspended operator interface 14 in a predetermined direction.

Moreover, with lighting control device 10A according to Variation 1, since operator interface 14 is configured as rod 24c which does not easily deform, operator interface 14 can be moved vertically upward. For example, it is possible to subtract from the counter value of counter 33a and change the lighting state of lamp 30 by moving operator interface 14 vertically upward.

Variation 2

Figure 9:
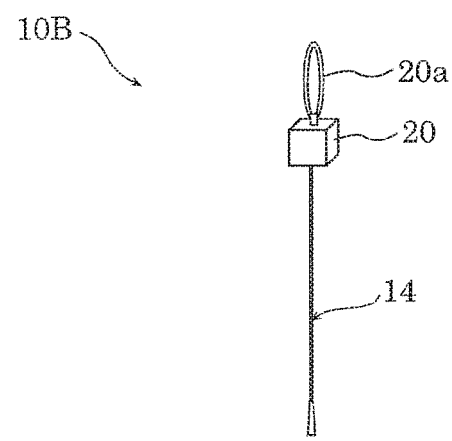
FIG. 9 is a perspective view of the lighting control device according to Variation 2 of Embodiment 1.

FIG. 9 is a perspective view of lighting control device 10B according to Variation 2 of Embodiment 1. With lighting control device 10B according to Variation 2, case 20 includes a strap on its outer surface. This strap serves as mount 20a. With lighting control device 10B, since case 20 includes a strap, lighting control device 10B can be easily taken from a back and easily carried around. Moreover, when a hook is provided on the top plate if support 50, lighting control device 10B can be operated while the strap is hung on the hook.

Variations 3 and 4

Figure 10:
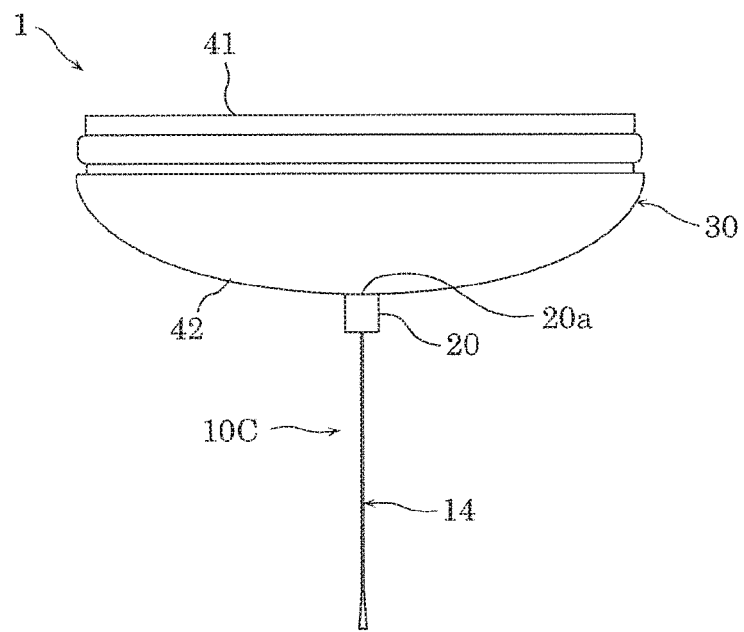
FIG. 10 is a front view of the lighting control device according to Variation 3 of Embodiment 1.

FIG. 10 is a front view of lighting control device 10C according to Variation 3 of Embodiment 1. With lighting control device 10C according to Variation 3, mount 20a of lighting control device 10C is attached in the central region of globe 42 of lamp 30.

Figure 11:
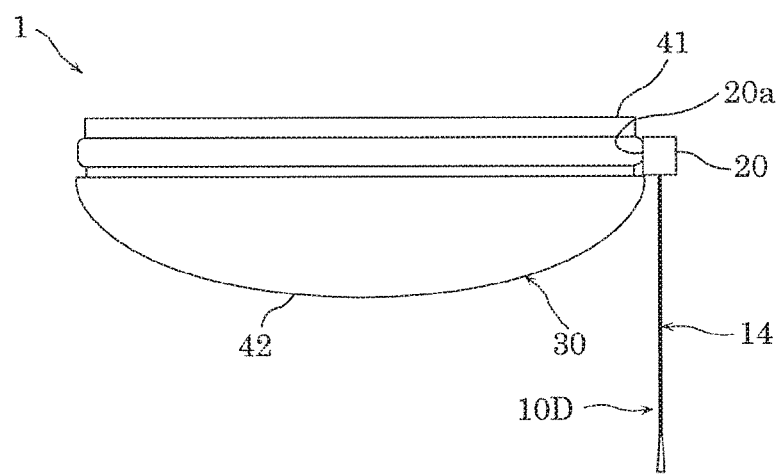
FIG. 11 is a front view of the lighting control device according to Variation 4 of Embodiment 1.

FIG. 11 is a front view of lighting control device 10D according to Variation 4 of Embodiment 1. With lighting control device 10D according to Variation 4, mount 20a of lighting control device 10D is attached on the side surface of main body 41.

With Variations 3 and 4, lighting control devices 10C and 10D can be directly attached to lamp 30. This makes it possible to easily operate lighting control devices 10C and 10D corresponding to lamp 30 by hand, and therefore makes it possible to easily change the lighting state of lamp 30.

Embodiment 2

In Embodiment 2, the pairing of lighting control device 10 and lamp 30 will be described. Pairing is performed in advance of controlling the control state of lamp 30 when, for example, the identification information is not written in lighting control device 10 or lamp 30, or for some reason the identification information has been deleted from lighting control device 10 or lamp 30.

Hereinafter, two cases in which pairing is performed will be described. The first case is when lamp 30 does not possess the identification information identifying lighting control device 10. The second case is when lighting control device 10 does not possess its own identification information.

(Case 1: When Lamp Does Not Possess the Identification Information Identifying the Lighting Control Device)

In FIG. 12, (a) illustrates lighting control device 10 possessing the identification information, and (b) illustrates a state in which this lighting control device 10 and lamp 30 that does not possess the identification information are connected together.

First, as illustrated in (a) in FIG. 12, first identification information transfer interface 16 is rotated 90° about axis of rotation 16a to cause the terminal of first identification information transfer interface 16 to protrude from case 20. Then, as illustrated in (b) in FIG. 12, the terminal of first identification information transfer interface 16 in lighting control device 10 is connected to the terminal of second identification information transfer interface 36 in lamp 30.

Figure 13:
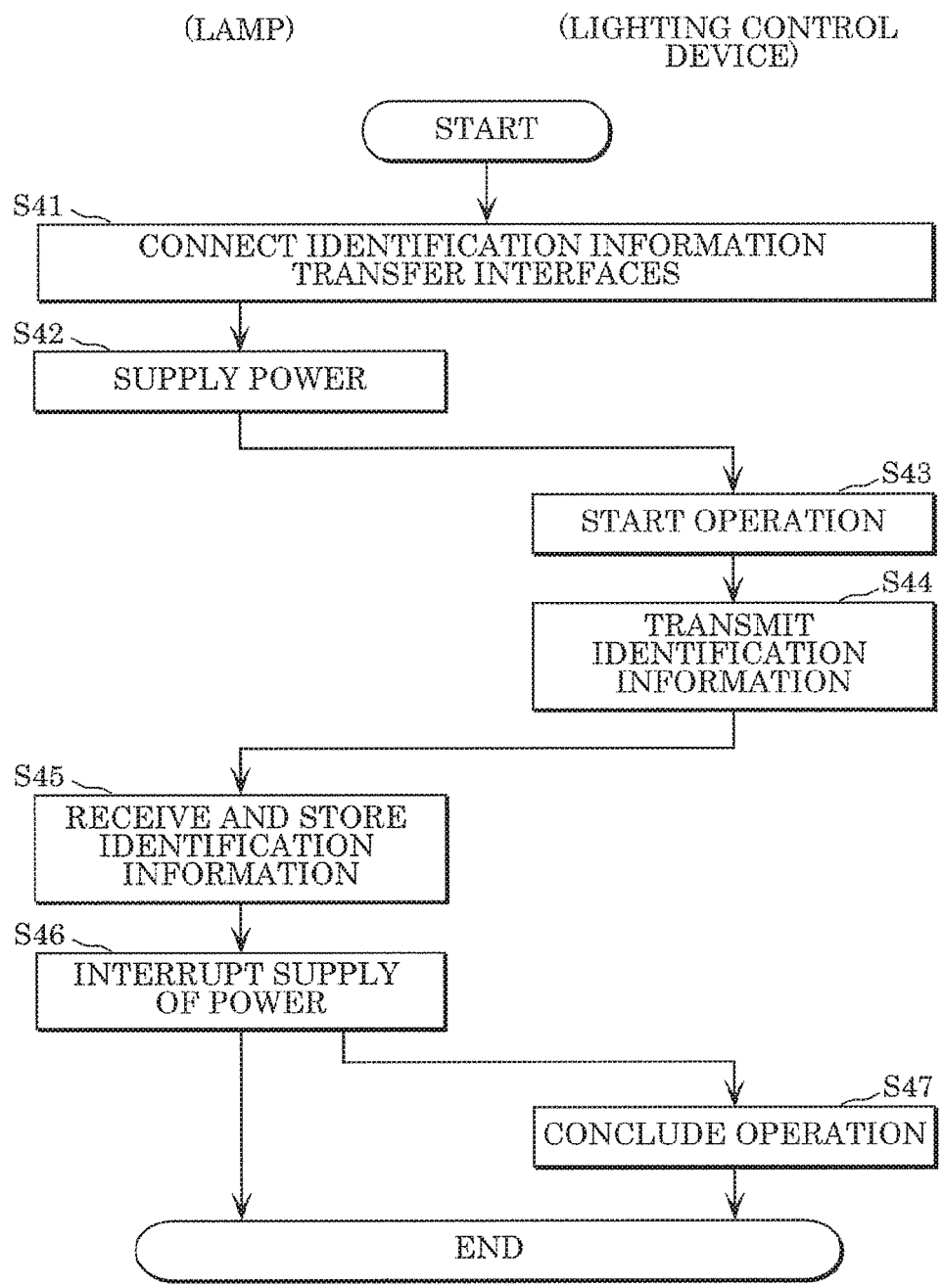
FIG. 13 is a flowchart of operations performed upon the pairing illustrated in FIG. 12.

FIG. 13 is a flowchart of operations performed upon pairing.

First, as previously described, identification information transfer interfaces 16 and 36 are connected together (S41).

Lamp 30 supplies power to lighting control device 10 via identification information transfer interfaces 16 and 36 when it is detected that identification information transfer interfaces 16 and 36 are connected together (S42).

Lighting control device 10 begins operation in response to receiving the power (S43). Then, first controller 13 reads its own identification information from first memory 12, and transfer the identification information to lamp 30 via identification information transfer interfaces 16 and 36 (S44).

Lamp 30 receives the identification information and second controller 33 writes and stores the identification information into second memory 32 (S45). Then, lamp 30 interrupts the supply of power to lighting control device 10 (S46).

Operation by lighting control device 10 is concluded in response to the interruption of the supply of power (S47). The pairing of lighting control device 10 and lamp 30 is completed with the above described operation flow.

(Advantageous Effects, Etc.)

As described above, lighting control device 10 according to this embodiment further includes first identification information transfer interface 16 that transfers the identification information to lamp 30, and before controlling lamp 30, first controller 13 transfers the identification information stored in first memory 12 to lamp 30 via first identification information transfer interface 16.

This configuration makes it possible to transfer the identification information to lamp 30 with a simple operation, and easily pair lighting control device 10 and lamp 30.

Moreover, in lighting device 1 according to this embodiment, lamp 30 includes second identification information transfer interface 36 that receives the identification information from an external device, and before lamp 30 is controlled by lighting control device 10, second controller 33 stores into second memory 32 the identification information received by second identification information transfer interface 36 from the external device.

With this configuration, in lighting device 1, it possible to transfer the identification information to lamp 30 with a simple operation, and easy to pair lighting control device 10 and lamp 30.

Note that although FIG. 12 illustrates an example in which terminals of lighting control device 10 and lamp 30 are connected to pair lighting control device 10 and lamp 30, the pairing method is not limited to this example. For example, lighting control device 10 and lamp 30 can be paired by connecting an external device (writer) that possess the identification information to the terminal of second identification information transfer interface 36 in lamp 30.

Moreover, pairing can be performed using a near field communication (NFC) protocol. For example, identification information can be transferred to lamp 30 by configuring second identification information transfer interface 36 as a wireless module capable of wireless communication and placing an IC card holding the identification information near second identification information transfer interface 36.

(Case 2: When Lighting Control Device does not Posses its Own Identification Information)

Figure 14:
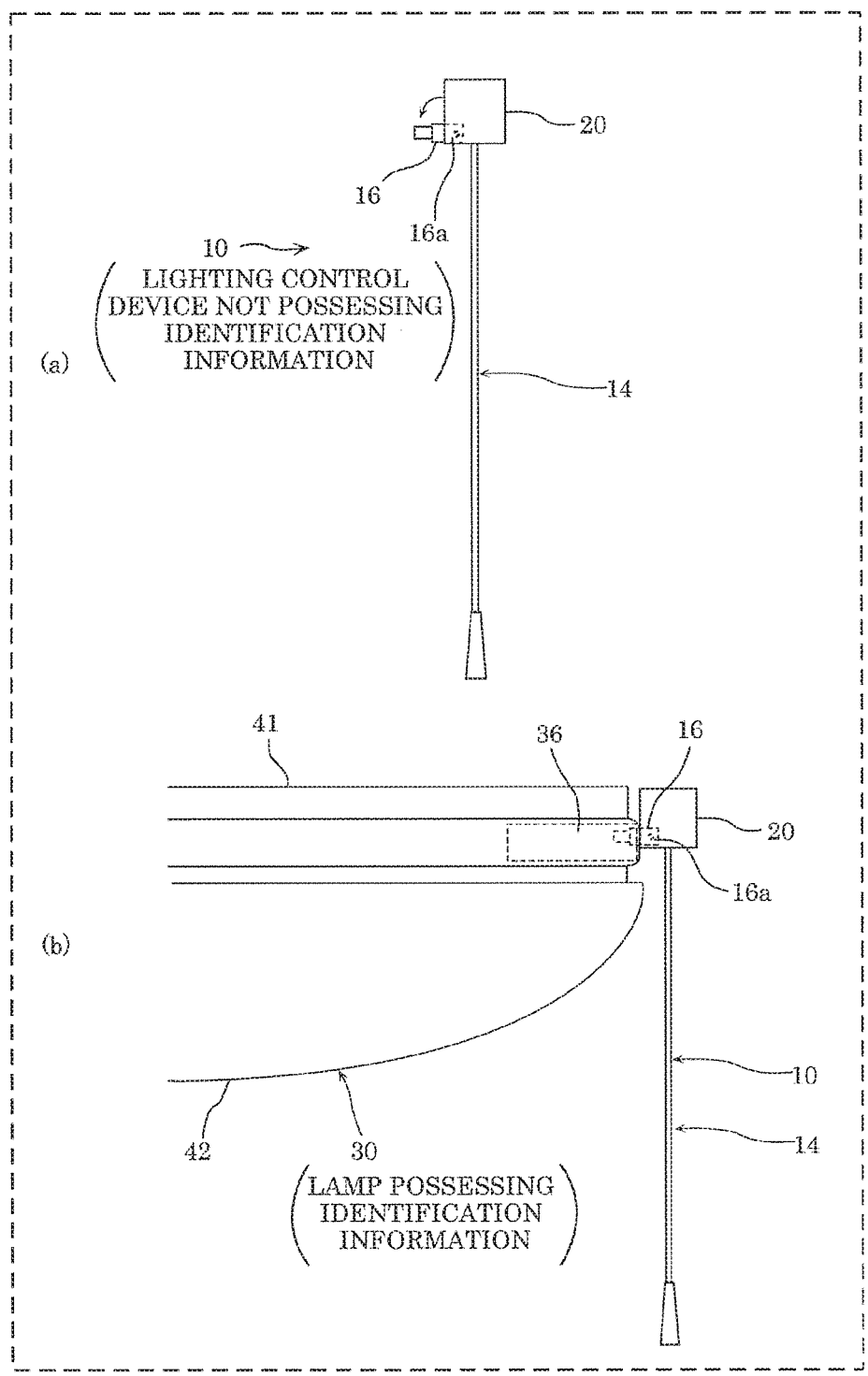
FIG. 14 illustrates a situation in which pairing is performed with a lighting control device that does not possess identification information in the lighting device according to Embodiment 2.

In FIG. 14, (a) illustrates lighting control device 10 that does not possess the identification information, and (b) illustrates a state in which this lighting control device 10 and lamp 30 that does possess the identification information are connected together.

First, as illustrated in (a) in FIG. 14, first identification information transfer interface 16 is rotated 90° about axis of rotation 16a to cause the terminal of first identification information transfer interface 16 to protrude from case 20. Then, as illustrated in (b) in FIG. 14, the terminal of first identification information transfer interface 16 in lighting control device 10 is connected to the terminal of second identification information transfer interface 36 in lamp 30.

Figure 15:
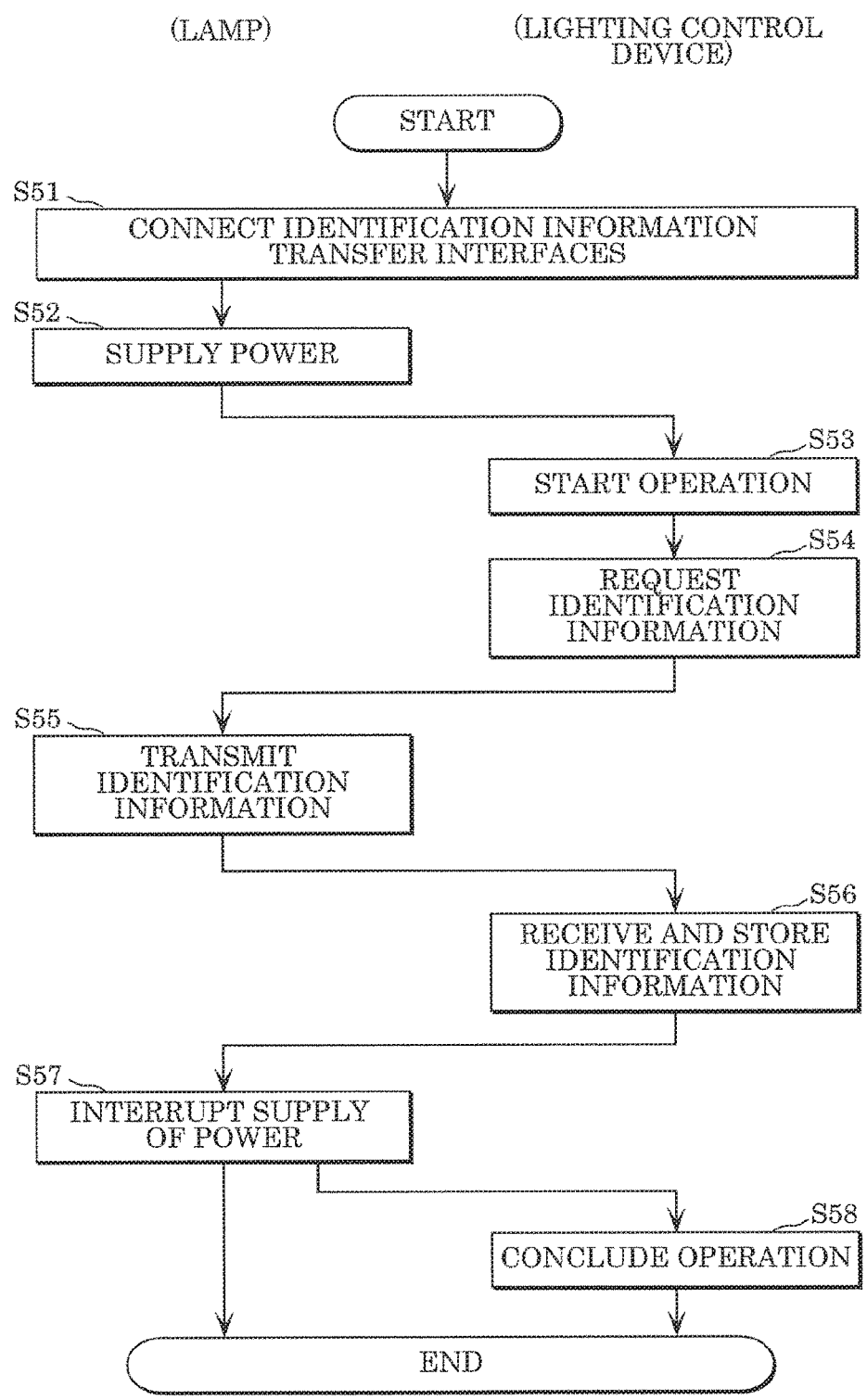
FIG. 15 is a flowchart of operations performed upon the pairing illustrated in FIG. 14.

FIG. 15 is a flowchart of operations performed upon pairing.

First, as previously described, identification information transfer interfaces 16 and 36 are connected together (S51).

Lamp 30 supplies power to lighting control device 10 via identification information transfer interfaces 16 and 36 when it is detected that identification information transfer interfaces 16 and 36 are connected together (S52).

Lighting control device 10 begins operation in response to receiving the power (S53). However, since lighting control device 10 does not possess the identification information, lighting control device 10 requests transmission of the identification information from lamp 30 (S54).

Then, lamp 30 reads from second memory 32 the identification information that allows lamp 30 to be controlled, and transfers the identification information to lighting control device 10 via identification information transfer interfaces 16 and 36 (S55).

Lighting control device 10 receives the identification information and first controller 13 writes and stores the identification information into first memory 12 (S56).

When the writing of the identification information into lighting control device 10 is complete, lamp 30 interrupts the supply of power to lighting control device 10 (S57).

Operation by lighting control device 10 is concluded in response to the interruption of the supply of power (S58). The pairing of lighting control device 10 and lamp 30 is completed with the above described operation flow.

(Advantageous Effects, Etc.)

Moreover, lighting control device 10 according to this embodiment includes first identification information transfer interface 16 that receives the identification information from an external device, and before controlling lamp 30, first controller 13 stores into first memory 12 the identification information received by first identification information transfer interface 16 from the external device.

This configuration makes it possible to transfer the identification information to lighting control device 10 with a simple operation, and easily pair lighting control device 10 and lamp 30.

Moreover, in lighting device 1 according to this embodiment, lamp 30 includes second identification information transfer interface 36 that transfers the identification information to lighting control device 10, and before lamp 30 is controlled by lighting control device 10, second controller 33 transfers the identification information stored in second memory 32 to lighting control device 10 via second identification information transfer interface 36.

This configuration makes it possible to transfer the identification information to lighting control device 10 with a simple operation, and easily pair lighting control device 10 and lamp 30.

Note that although FIG. 14 illustrates an example in which terminals of lighting control device 10 and lamp 30 are connected to pair lighting control device 10 and lamp 30, the pairing method is not limited to this example. For example, lighting control device 10 and lamp 30 can be paired by connecting an external device (writer) that possess the identification information to the terminal of first identification information transfer interface 16 in lighting control device 10.

Moreover, pairing can be performed using a near field communication (NFC) protocol. For example, identification information can be transferred to lighting control device 10 by configuring first identification information transfer interface 16 as a wireless module capable of wireless communication and placing an IC card holding the identification information near first identification information transfer interface 16. In this case, power can be generated in power generator 15 by moving operator interface 14 and lighting control device 10 can be ran off that power.

Lighting control device 10 and lighting device 1 have hereinbefore been described based on embodiments, but the present disclosure is not limited to the above embodiments. For example, it is understood that various modifications may be made to the above embodiments and that the subject matter disclosed herein may be implemented in various forms and examples, and that they may be applied in numerous applications, only some of which have been described herein. It is intended by the following claims to claim any and all modifications and variations that fall within the true scope of the present teachings.

For example, in Embodiment 1, one lamp 30 and one lighting control device 10 are provided, but this example is not limiting. For example, one lamp 30 may be controlled by a plurality of lighting control devices 10. Moreover, a plurality of lamps 30 may be controlled using one lighting control device 10.

Moreover, in Embodiment 1, lamp 30 is exemplified as a ceiling light, but lamp 30 is not limited to this example. For example, lamp 30 may be an LED base light or an LED down light.

Moreover, in Embodiment 1, power generator 15 is exemplified as utilizing the piezoelectric effect or electromagnetic induction, but power generator 15 is not limited to this example. For example, power generator 15 may generate power by utilizing the magnetostriction effect.

What is claimed is:

1. A lighting control device, comprising:
a first wireless communicator that wirelessly communicates with a lamp;
first memory that stores identification information identifying the lighting control device;
a first controller that transmits a control command for controlling the lamp to the lamp via the first wireless communicator;
an operator interface suspended under weight of the operator interface; and
a power generator that is connected to the operator interface, generates power from mechanical energy produced by the operator interface being moved in a predetermined direction, and supplies the power to the first controller, the first memory, and the first wireless communicator,
wherein when the operator interface is moved and the first controller receives the power, the first controller reads the identification information from the first memory, transmits the identification information and the control command to the lamp via the first wireless communicator, and controls the lamp.

2. The lighting control device according to claim 1, wherein
the operator interface includes a string, and
the power generator generates the power from the mechanical energy produced by the operator interface being moved vertically downward while being held.

3. The lighting control device according to claim 1, wherein
the operator interface is a rod, and
the power generator generates the power from the mechanical energy produced by the operator interface being held and moved either one of vertically downward and vertically upward.

4. The lighting control device according to claim 1, wherein
the power generator generates the power from the mechanical energy by utilizing either one of a piezoelectric effect and electromagnetic induction.

5. The lighting control device according to claim 1, further comprising
a case that houses the first wireless communicator, the first memory, the first controller, and the power generator,
wherein a top part of the operator interface is connected to the power generator in the case, and a bottom part of the operator interface protrudes from the case.

6. The lighting control device according to claim 5, wherein
the case includes, on an outer surface, a mount for attaching the case to another component.

7. The lighting control device according to claim 1, further comprising
a first identification information transfer interface that transfers the identification information to the lamp,
wherein before controlling the lamp, the first controller transfers the identification information stored in the first memory to the lamp via the first identification information transfer interface.

8. The lighting control device according to claim 1, further comprising
a first identification information transfer interface that receives the identification information from an external device,
wherein before controlling the lamp, the first controller stores into the first memory the identification information received by the first identification information transfer interface from the external device.

9. A lighting device, comprising:
a lamp; and
the lighting control device according to claim 1,
wherein the lamp includes:
a light source;
a second wireless communicator that wirelessly communicates with the first wireless communicator in the lighting control device;
second memory that stores identification information identifying the lighting control device; and
a second controller that compares identification information identifying the lighting control device and received by the second wireless communicator against the identification information stored in the second memory, and when the identification information matches, controls operation of the light source in accordance with a control command for controlling the lamp received by the second wireless communicator.

10. The lighting device according to claim 9, wherein
each time the second wireless communicator receives the control command from the lighting control device, the second controller switches between turning on, dimming, and turning off the light source in a predetermined order.

11. The lighting device according to claim 9, wherein
the lamp further includes a second identification information transfer interface that receives the identification information from an external device, and
before the lamp is controlled by the lighting control device, the second controller stores into the second memory the identification information received by the second identification information transfer interface from the external device.

12. The lighting device according to claim 9, wherein
the lamp further includes a second identification information transfer interface that transfers the identification information to the lighting control device, and
before the lamp is controlled by the lighting control device, the second controller transfers the identification information stored in the second memory to the lighting control device via the second identification information transfer interface.

* * * * *